United States Patent [19]
Dutton et al.

[11] Patent Number: 6,138,100
[45] Date of Patent: Oct. 24, 2000

[54] INTERFACE FOR A VOICE-ACTIVATED CONNECTION SYSTEM

[75] Inventors: Dawn L. Dutton, West Long Branch, N.J.; Shrikanth Sambasivan Narayanan, Riverside, Conn.; Ilija Zeljkovic, Westfield, N.J.

[73] Assignee: AT&T Corp., New York, N.Y.

[21] Appl. No.: 09/059,912

[22] Filed: Apr. 14, 1998

[51] Int. Cl.[7] ............................. G10L 11/00; G06F 17/21; G06F 15/00; G06F 7/00

[52] U.S. Cl. ............................. 704/275; 704/10; 704/270; 704/9; 704/257; 707/2; 707/3; 707/4; 707/5; 707/505

[58] Field of Search ....................................... 704/231, 251, 704/275, 9, 257, 270; 707/1, 2, 513; 379/220, 127, 201, 221, 213, 216

[56] References Cited

U.S. PATENT DOCUMENTS

| | | | |
|---|---|---|---|
| 4,979,206 | 12/1990 | Padden et al. | 379/213 |
| 5,297,183 | 3/1994 | Bareis et al. | 704/251 |
| 5,479,488 | 12/1995 | Lennig et al. | 704/252 |
| 5,574,908 | 11/1996 | Harding et al. | 707/1 |
| 5,617,567 | 4/1997 | Doktor | 707/2 |

OTHER PUBLICATIONS

"Internetworking with TCP/IP: Principles, Protocols and Architecture", by Douglas Comer, Englewood Cliffs, NJ, Prentice Hall, 1988.

"Hypertext Transfer Protocol (HTTP) Working Draft of the Internet Engineering Task Force, 1993", by T. Berners–Lee, and D. Connolly, –*HTTP: A protocol for networked information*.

"Speech Rec Rules" CallCenter (Computer Telephony) Jun. 1996.

"Directory Services—Beyond Easy Lookups" Computer Telephony Aug. 1996.

*Primary Examiner*—Richemond Dorvil
*Assistant Examiner*—Daniel A. Nolan
*Attorney, Agent, or Firm*—Kenyon & Kenyon

[57] ABSTRACT

A method and apparatus for defining an interface for a system using voice commands to connect a first user to a second user over a network. The interface receives a request to define the interface for a particular user. The interface receives a first information item, and searches at least one database for a second information item indexed by the first information item. Another search is performed for a third information item indexed by the second information item. This process is continued until the interface has gathered sufficient information items to construct a natural language grammar for use by the interface. The interface uses the natural language grammar to parse commands given by the user for future communications connections.

21 Claims, 3 Drawing Sheets

INTERFACE FOR A VOICE-ACTIVATED CONNECTION SYSTEM

FIELD OF THE INVENTION

The invention relates to voice-activated connection (VAC) systems in general. More particularly, the invention relates to a method and apparatus for constructing an interface for use with a VAC system while minimizing the amount of information required for input by the user.

BACKGROUND OF THE INVENTION

Recent developments in the fields of speech-recognition, natural language systems and high-speed networking have greatly contributed to the advancement of VAC systems. It is now possible for a person to pick up a telephone handset and initiate a call by uttering simple voice commands such as "call mom" or "call home," rather than using the old-fashioned telephone keypad to dial a telephone number. One such system is described in U.S. Pat. No. 5,719,921. In fact, users with speakerphones no longer need to even use a telephone handset to initiate calls. Specifically, a speakerphone user can simply power on the speakerphone, utter commands in the user's language (e.g., English or Spanish) to request a call connection to another person, and sit back while the call is completed by the system.

The aforementioned functionality provided by VAC systems stems from a combination of several different technologies. Prominent among such technologies are speech-recognition systems and natural language systems, both of which are well-known in the art. A short description of each such technology, however, may prove beneficial to a better understanding of the problems that are solved by the present invention.

Modern speech recognition systems are predicated on the premise that any speech can be broken down into a sequence of sounds selected from a set of approximately forty such sounds called "phonemes". Different sounds, or phonemes, are produced by varying the shape of the vocal tract through muscular control of the speech articulators (e.g., lips, tongue, jaw, etc.). Speech recognition systems basically provide transcription of spoken utterance to a string of phonemes. A stream of a particular sequence of phonemes collectively represents a word or a phrase. In essence, speech recognition systems operate by identifying and analyzing the elemental phonemes contained in a speech signal in order to recognize the word or phrase associated with such phonemes. Hence, for speech recognition systems to be useful, they need to be embodied with the concept of language (e.g., syntax and semantics). The natural language systems provide that capability.

While speech-recognition systems afford VAC systems the ability to recognize certain words and phrases, natural language systems aim at providing rules that constitute words and phrases (language grammar rules) and attaching a meaning to the words and phrases that are recognized (language understanding). Natural language systems operate as a front-end system between a user and the VAC system providing a means for a conversational interface between the user and a machine. In other words, the natural language interface translates the language spoken by the user (e.g., English) into a language that is understandable by the target computer system. The translation function of natural language systems is accomplished through the use of a grammar that characterizes a set of acceptable input strings (or more generally, a statistical language model). This enables the speech recognition system to transcribe a spoken utterance into words and phrases as governed by the given language model. The language understanding component of the natural language system receives the output of the speech recognition system as its input. The language understanding component embodies rules and algorithms constituting a language parser (e.g., heuristics or statistical models) which produce a parse tree for the input string. The parse tree is then translated into an expression (or set of expressions) which assigns to the input string a meaning that is interpretable by the target computer system.

Both speech recognition systems and natural language systems share a common element in that they both perform better with a larger number of reference patterns (e.g., phonological information or speech templates for voice recognition systems, word and phrase patterns for natural language systems). For natural language systems, the larger the vocabulary of the system, the more flexible and user-friendly the system becomes. For example, it is easier for a person to communicate a message to another person with a vocabulary of one thousand words than three hundred words. Similarly, it is easier to communicate with a computer with a larger vocabulary of commonly understood terms. Furthermore, a larger vocabulary is more likely to accommodate the varied speaking styles and idiosyncrasies of different people. This larger vocabulary also helps speech-recognition systems, since a larger vocabulary tends to allow a speaker to construct longer phrases, and the performance of many conventional speech-recognition systems in general tends to improve when multiple words are spoken as compared to short or single words.

Because VAC systems use speech-recognition systems and natural language systems the advantages of a large vocabulary enjoyed by those systems extend to VAC systems as well. Moreover, a large vocabulary provides additional benefits for users of VAC systems. For example, VAC systems enable users to perform a variety of telephony user operations, such as calling, messaging and call forwarding by speaking names from a personally configured list of names or from a generic list provided by a service provider. It is often desirable to enhance the flexibility of the VAC lists by the association of additional attributes to each name in the list, such as a place of work or residence, or the type of service (e.g., cellular or pager). Further, more generally, it is desirable to automatically include other entries (telephone numbers, fax numbers, email address) related to a particular entry (for example, if only the work number of a particular user is originally specified in the user-configured list, automatically retrieve and enter all other available numbers such as pager, cellular, fax, and home and other pertinent information such as email, URL address etc. to the list). The additional attributes and entries to a user's list allow the VAC systems to provide enhanced services and functionality to a user. For example, when a user utters a command, such as "call mom" to a VAC system, a telephone call is automatically initiated and directed to the called party associated with that command. However, the called party may have more than one telephone number. In such a case, it would be desirable for the VAC system to query the user for the type of phone number to be dialed, such as the home number, the office number or the telephone number of the called party's wireless telephone set.

In current VAC systems, however, such additional attributes are required to be explicitly specified by the user, either by voice or text entries. While such an approach has the advantage of allowing the user to have better control over their VAC list, adding such additional attributes becomes tedious and time-consuming for the user. For example, a user would have to—at a minimum—enter a ten digit telephone number and a word or phrase for use as an identification tag for the number, not to mention any additional attributes a user might want to associate with the number (e.g., an address). Combine this with the need to input multiple entries/called parties to the calling list and the burden upon the user becomes even worse. One other problem is to update and keep the information contained these lists current, a task that is tedious to accomplish manually.

In addition to the above disadvantages, the user may not have ready access to additional attributes for the called party. This means the user must first find the information through another source prior to entry. In some instances, the user may not have access to the resources providing such information, such as those stored on a private network or even public networks such as the Internet or World Wide Web (WWW).

In view of the foregoing, it can be appreciated that a substantial need exists for an interface for a VAC system which solves the above-discussed problems.

SUMMARY OF THE INVENTION

The present disclosure is directed to a method and apparatus for automatically retrieving from pre-defined databases information to be added to bank of data for a VAC system. In an embodiment of the principles disclosed herein, a user who wishes to create a new entry provides certain information to a VAC system. The VAC system uses the user-provided information, or a portion thereof, as a search key to query pre-defined databases. To illustrate the principles of the present disclosure, let us consider the case of a first person who desires to add a second person to a calling list for use with a VAC system. The first person sends a request to the VAC system to add the second person to a calling list. The request may include, for example, a first information item that uniquely identifies the second person, e.g., a telephone number. The VAC system then launches a query to at least one pre-defined database for additional information items indexed by the first information item. The additional information items may be used as search keys to retrieve from other pre-defined databases supplementary information items. This process continues until the VAC system has gathered sufficient information items related to the second person to construct a natural language grammar for use with the VAC system. Examples of additional information items include the second person's office telephone number, pager number, the telephone number of the second person wireless telephone set, the second person's home address, work address, e-mail address, home page URL, neighbor's address and, employer information, to name a few. Once all the appropriate information items have been gathered by the VAC system, then the VAC system uses the natural language grammar to parse commands given by the first person to request future communications connections (e.g., voice connections) with the second person.

With these and other advantages and features of the invention that will become hereinafter apparent, the nature of the invention may be more clearly understood by reference to the following detailed description of the invention, the appended claims and to the several drawings herein.

DETAILED DESCRIPTION

Figure 1:
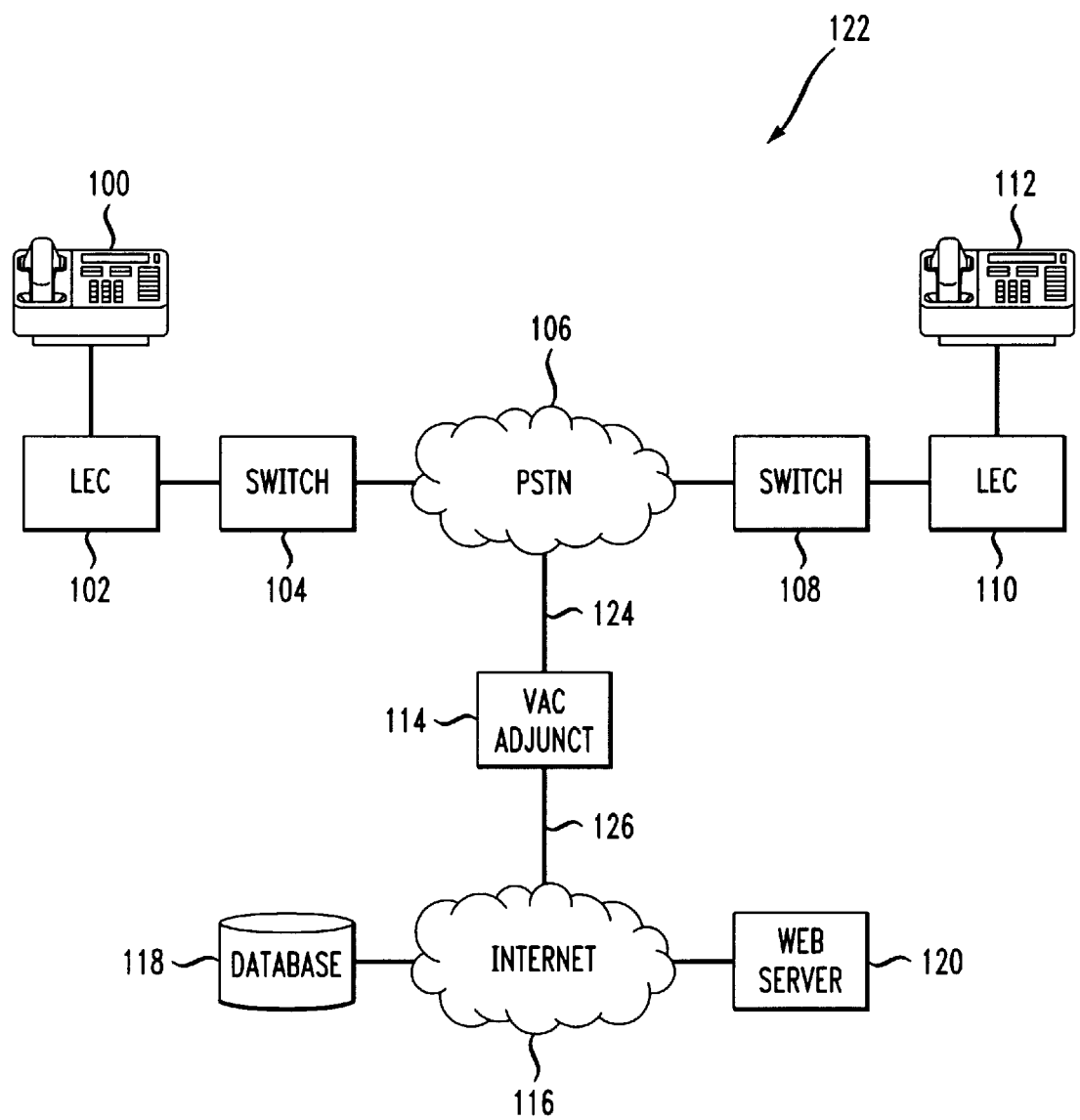
FIG. 1 is a block diagram of a telecommunications system which is suitable to practice one embodiment of the present invention.

Referring now in detail to the drawings wherein like parts are designated by like reference numerals throughout, there is illustrated in FIG. 1 a diagram of a telecommunications system 122 which is suitable to practice one embodiment of the present invention. Audio interface devices, such as telephones 100 and 112, are connected to local exchange carriers (LEC) 102 and 110, respectively. Audio interface devices other than a telephone may also be used. For example, the audio interface device could be a multimedia computer having telephony capabilities. LECs 102 and 110 are connected to switches 104 and 108, respectively, which are both connected to a communication network 106 such as the public switched telephone network (PSTN). In this embodiment of the invention, communication network 106 is a long distance telephone network, and switches 104 and 108 can be nodes in communication network 106 or in LECs 102 and 110. Communication network 106 would generally have other switches similar to switches 104 and 108 for routing calls. However, only two switches are shown in FIG. 1 for clarity. Upon receipt of the call at switch 104 or 108, the call is then routed to a VAC adjunct 114 via communication network 106 and link 124. Thus, there is established an audio channel between telephone 100 or 112 and VAC adjunct 114. The routing of calls through a telecommunications network is well known in the art and will not be described further herein. VAC adjunct 114 is connected to Internet 116 via link 126. VAC adjunct 114 can access a database 118 and web server 120 via Internet 116.

Figure 2:
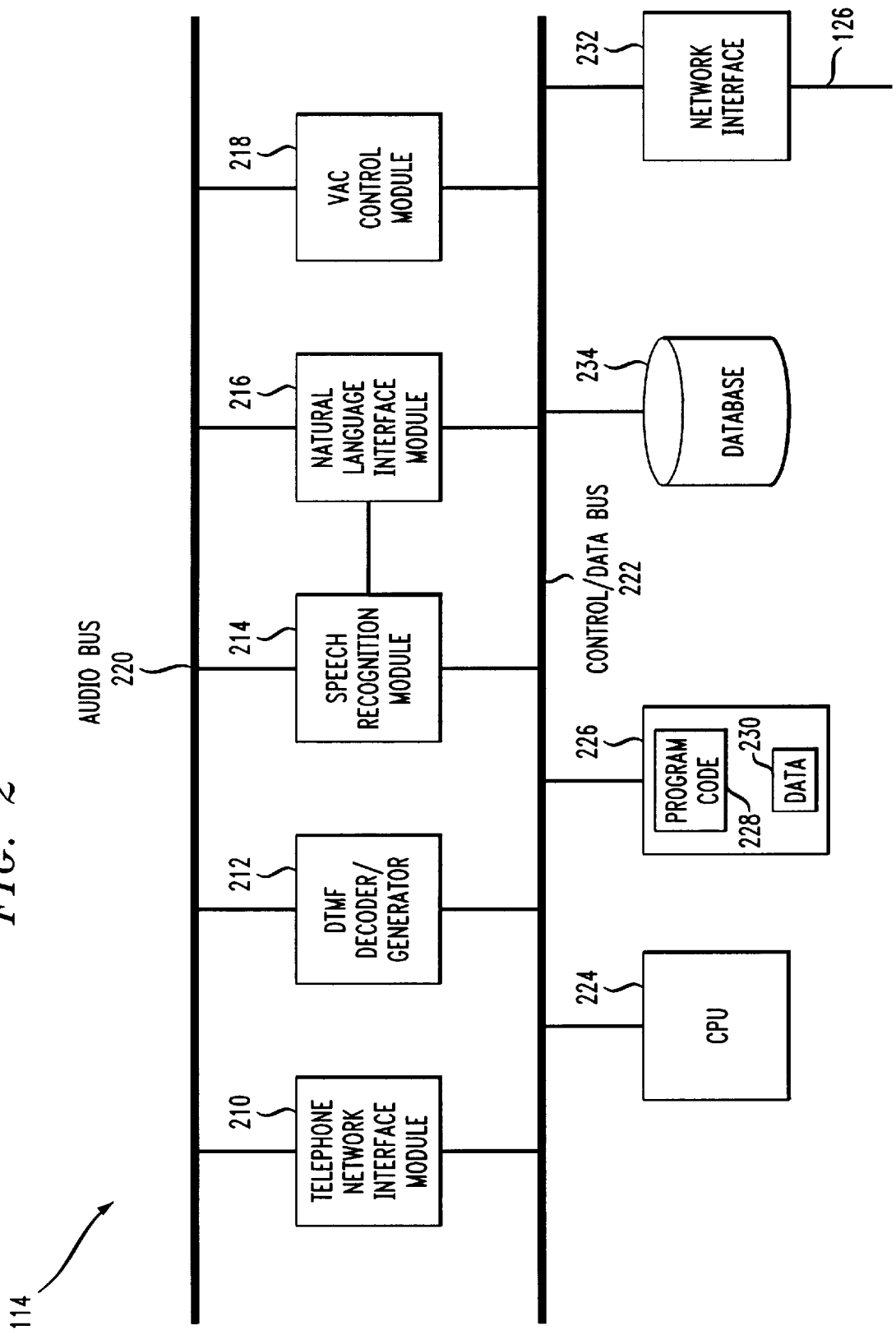
FIG. 2 is a block diagram of a VAC adjunct in accordance with one embodiment of the present invention.

FIG. 2 is a block diagram of a VAC adjunct in accordance with one embodiment of the present invention. VAC adjunct 114 comprises a telephone network interface module 210, a dual-tone multiple frequency (DTMF) decoder/generator 212, a speech recognition module 214, a natural language interface module 216 and a VAC control module 218, each of which is connected to an audio bus 220 and a control/data bus 222. Further, VAC adjunct 114 contains a central processing unit (CPU) 224, memory unit 226, a database 234 and a network interface 232, each of which is connected to control/data bus 222.

The overall functioning of VAC adjunct 114 is controlled by CPU 224. CPU 224 operates under control of executed computer program instructions 228 and data 230 which are stored in memory unit 226. The control of an apparatus, such as VAC adjunct 114, using a central processing unit executing software instructions is well known in the art and will not be described in further detail herein.

Memory unit 226 may be any machine readable storage device, such as random access memory (RAM), a read only memory (ROM), a programmable read only memory (PROM), an erasable programmable read only memory (EPROM), an electronically erasable programmable read only memory (EEPROM), a magnetic storage media (i.e., a magnetic disk), or an optical storage media (i.e., a CD-ROM). Further, VAC adjunct 114 may contain various combinations of machine readable storage devices, which are accessible by CPU 224, and which are capable of storing a combination of computer program instructions 228 and data 230.

Network interface 232 is used for communications between VAC adjunct 114 and web server 120 or database 118. Upon receipt of a call from telephone 100 or 112, VAC adjunct 114 establishes a communication channel with web server 120 or database 118 via network interface 232. In a WWW embodiment, a transmission control protocol/internet protocol (TCP/IP) socket connection is established according to principles well known in the art. For additional information on TCP/IP, see Comer, Douglas, *Internetworking with TCP/IP: Principles, Protocols, and Architecture,* Englewood Cliffs, N.J., Prentice Hall, 1988, which is incorporated by reference herein. VAC adjunct 114 communicates with web server 120 or database 118 using a document serving protocol. As used herein, a document serving protocol is a communication protocol for the transfer of information between a client and a server. In accordance with such a protocol, a client requests information from a server by sending a request to the server and the server responds to the request by sending a document containing the requested information to the server. Thus, a document serving protocol channel is established between VAC adjunct 114 and web server 120 or database 118. In an advantageous WWW embodiment, the document serving protocol is the Hypertext Transfer Protocol (HTTP). This protocol is well known in the art of WWW communication and is described in detail in Berners-Lee, T. and Connolly, D., *Hypertext Transfer Protocol (HTTP) Working Draft of the Internet Engineering Task Force,* 1993 which is incorporated herein by reference.

Thus, VAC adjunct 114 communicates with web server 120 or database 118 using the HTTP protocol. As far as web server 120 or database 118 is concerned, it behaves as if were communicating with any conventional WWW client executing a conventional graphical browser. Thus, web server 120 or database 118 serves documents to VAC adjunct 114 in response to requests it receives over link 126. A document, as used herein, is a collection of information. The document may be a static document in that the document is pre-defined at web server 120 or database 118 and all requests for that document result in the same information being served. Alternatively, the document could be a dynamic document, whereby the information which is served in response to a request is dynamically generated at the time the request is made. Typically, dynamic documents are generated by scripts, which are programs executed by web server 120 or database 118 in response to a request for information. For example, a Uniform Resource Locator (URL) may be associated with a script. When web server 120 or database 118 receives a request including that URL, it will execute the script to generate a dynamic document, and will serve the dynamically generated document to the client which requested the information. The use of scripts to dynamically generate documents is well known in the art.

The telephone network interface module 210 handles the low level interaction between VAC adjunct 114 and communication network 106 in general, and switches 104 and 108 in particular. In one embodiment, module 210 consists of one or more analog tip/ring loop start telephone line terminations. Through module 210, CPU 224 is able to control link 124 via control data bus 222. Control functions include on-hook/off-hook, ring detection, and far-end on-hook detection. In an alternate embodiment, module 210 includes one or more channelized digital interfaces, such as T1/DS1, E1, or PR1. Signaling can be in-band or out-of-band.

DTMF decoder/generator 212 handles the conversion of DTMF tones from telephone 100 or 112 into digital data. DTMF decoder/generator 212 also handles the generation of DTMF tones from digital data. DTMF tones are another means by which a user can input information items such as names, addresses, telephone numbers and user options for VAC adjunct 114, in addition to that provided by speech recognition module 214.

Speech recognition module 214 performs speech recognition of speech signals originating at user telephone 100 or 112 and received over audio bus 220. Such speech signals are processed and converted into digital data by speech recognition module 214. Module 214 receives an audio signal over audio bus 220. The audio signal is converted to a corresponding electrical format, and then is electrically conditioned into a form suitable for digital sampling. Once the audio speech signal has been converted to a representative electrical signal, it is received by an analog-to-digital (A/D) converter. The A/D converter samples the representative electrical signal at a suitable sampling rate, and outputs a digitized audio signal. The digitized audio signal is then processed to extract various time-domain and frequency-domain sound characteristics, that are used as a basis for identifying a particular phoneme sound type that is contained within the audio speech signal. It is worthy to note that the functions of module 214 may be implemented in other parts of telecommunication system 122. For example, A/D and D/A conversion could be implemented in switch 104 or 108 and still fall within the scope of the invention.

Natural language module 216 builds a grammar for VAC adjunct 114, and translates natural language statements into instructions for CPU 224. Natural language module 216 employs a grammar which characterizes a set of acceptable input strings (or a statistical language model such as a bigram model). This language model is employed by the speech recognition module 214 to produce an output string that is comprised of a word or phrase sequence as governed by the language (syntax) model. The output string of the speech recognition module serves as input to the language understanding component of the Natural Language module 216—a parser in this module, governed by the language understanding (semantics) rules or models to produce a parse tree (parse trees for ambiguous input) for the input string. The parse tree is then translated into an expression (or set of expressions) which represents the meaning of the input string and which is interpretable by CPU 224. A wide variety of grammar formalisms and parsing strategies have been developed, and will not be described in further detail herein.

VAC control module 218 performs administrative functions for VAC adjunct 114, such as providing a user interface, housekeeping tasks and command and control. VAC control module 218 also maintains and updates each user profile, which includes personally-configured lists of names or selected generic lists provided by a service ("VAC lists") as well as additional attributes found by VAC adjunct 114. Each user profile is stored in database 234.

It is noted that each module 210, 212, 214, 216, 218 are shown as separate functional modules in FIG. 2. The functionality of each of modules 210, 212, 214, 216, and 218 may be implemented in hardware, software, or a combination of hardware and software, using well known signal processing and statistical techniques. The functioning of each of these modules will be described in further detail below with reference to FIG. 3.

Figure 3:
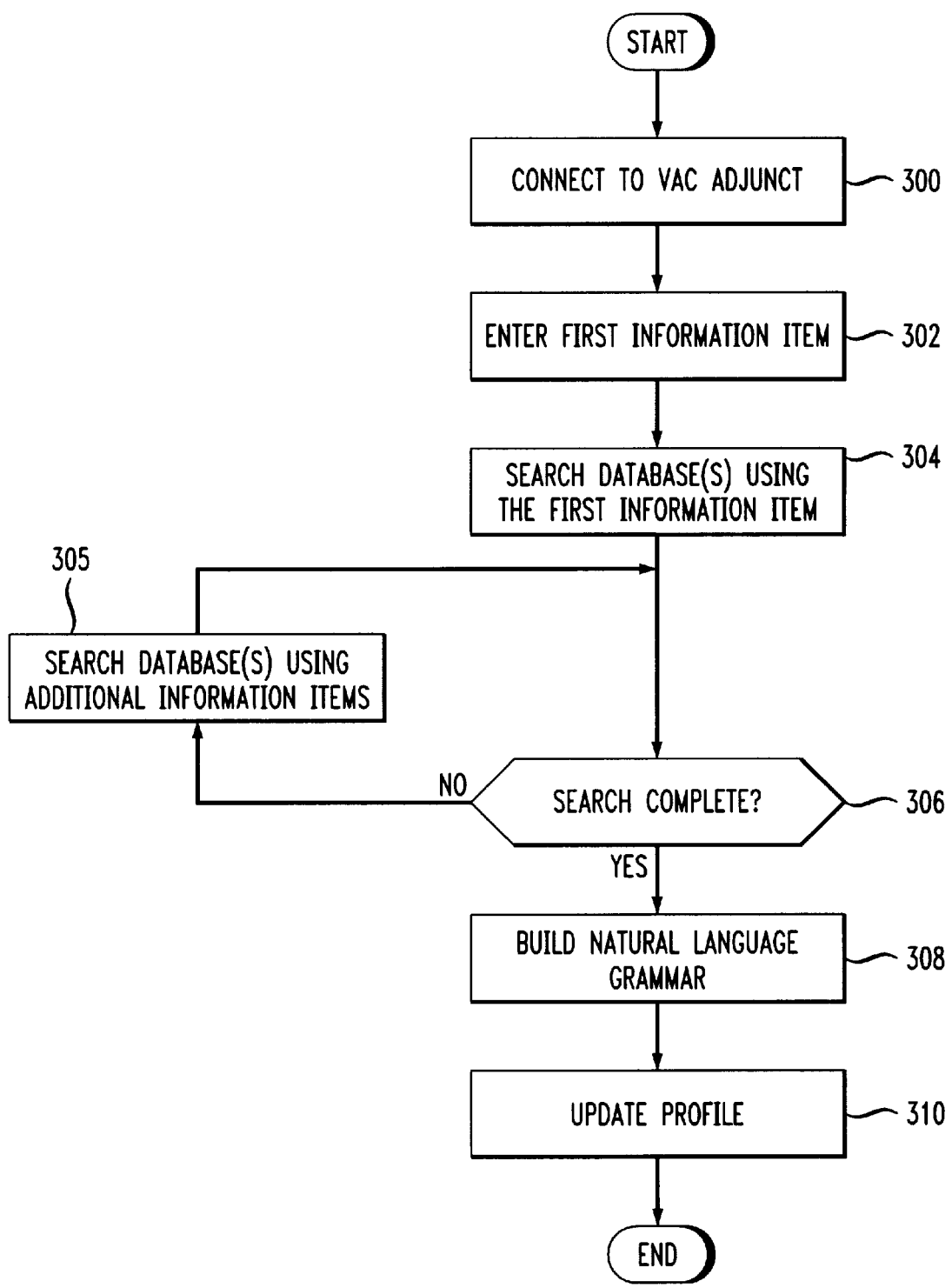
FIG. 3 is a block flow diagram of the steps performed by a VAC adjunct in accordance with one embodiment of the invention.

FIG. 3 is a block flow diagram of the steps performed by a VAC adjunct in accordance with one embodiment of the invention. As shown in FIG. 3, a call is connected to VAC adjunct 114 at step 300. A call is initiated from telephone 100. The call gets routed to LEC 102 which forwards the call to switch 104. Upon receipt of the call, switch 104 in turn routes the call to VAC adjunct 114 via communication network 106 and link 124. Thus, there is established an audio channel between telephone 100 and VAC adjunct 114.

Once an audio channel has been established, the user is presented with application-specific options, including initially configuring or modifying a personal user profile with lists of names or telephone numbers to be automatically dialed by VAC adjunct 114. Preselected lists may also be made available for selection by the user.

If the user wants to initially configure or modify a list, VAC control module 218 prompts the user to enter a first information item at step 302. This information item would be some sort of unique identifier for the person being added to the list. For example, the first information item could be a ten-digit telephone number, an electronic mail address, a social security number, a personal information number (PIN), URL and so forth. Although in this embodiment of the invention the first information item (also referred to as a "seed") is received by module 218 as a voice entry, it can be appreciated that the first information could also be a text entry, e.g., using the telephone keypad or computer keyboard.

Once module 218 receives the first information item, it then begins searching all available resources at step 304 for additional information items or attributes indexed by the first information item. Examples of additional attributes include, without limitation, a home address, a home telephone number, a work address, a work telephone number, a facsimile number, a mobile telephone number, a pager number, an email address, a home page URL, a neighboring address, local emergency service telephone numbers or addresses, and so forth. For example, module 218 could search database 234 for additional attributes. Module 218 could also establish a WWW link with web server 120 or database 118 and search one or both. Particular useful sources of additional attributes would include electronic white pages, electronic yellow pages, human resource database files, documents written in Hyper Text Markup Language (HTML) such as documents stored on one or more servers associated with the Internet or WWW, and so forth. Each additional attribute would be given a unique identifier and stored in database 234 as part of the personal user profile for that particular initial information item.

In addition to searching various resources based on the first information item, additional searches could be performed on the retrieved additional information items based on several factors, such as the number of available resources, the number of additional information items found, time limitations, and so forth. Thus, module 218 tests whether the search is complete at step 306. If additional information items are required or desired, then module 218 performs an additional search based on the information items retrieved from the prior search at step 305. If the search is complete at step 306, the additional information items are given to natural language interface module 216 to build a grammar using the retrieved information items. Module 216 builds the grammar at step 308 using techniques that are well known in the art, and therefore will not be described in detail herein. Finally, the user profile is updated and stored in database 234 at step 310.

The operation of VAC adjunct 114 will be described using the following example. Assume that a first user (i.e., the caller) dials the number "1-800-555-1212" to gain access to VAC adjunct 114. The call connection request is sent to LEC 102, which forwards it to switch 104. Switch 104 recognizes the number and routes the call to VAC adjunct 114 via communication network 106. Once connected to VAC adjunct 114, the first user requests to update his or her VAC list to include a second user (i.e., the person being called). VAC control module 218 prompts the first user for a unique identifier for the second user, and a unique word or phrase to automatically complete a call connection to the second user ("tag"). The first user enters the second user's telephone number, and the word "Daddy." Module 218 associates the word "Daddy" to the second user's telephone number. Thus, whenever the first user connects to VAC adjunct 114 and speaks the phrase "call daddy," VAC adjunct 114 attempts to complete a call connection to the telephone number associated with the word "Daddy," which in this example is the second user's telephone number. Thus, the first user's VAC list at a first point appears as follows:

| Voice Label | Telephone Number |
|---|---|
| Dutton-Narayan-Zeljkovic 1-4-6 <br> <call daddy> | 908-555-1212 |

In accordance with the principles of this embodiment of the present invention, VAC adjunct 114 attempts to expand the words or phrases that can be spoken to initiate a call request to the second user's telephone number. VAC adjunct 114 opens a connection to web server 120 which stores electronic white page files. Module 218 submits a request to search the files using the second user's telephone number. Web server 120 sends back the second user's FULL NAME "Joe Smith" and HOME ADDRESS "885 South Avenue, Westfield, N.J. 07090" to module 218. Module 218 passes this information to natural language interface module 216 which uses the second user's FULL NAME and ADDRESS to expand the natural language grammar associated with the second user's telephone number. Thus, the first user's VAC list at a second point appears as follows:

| Voice Label | Telephone Number |
|---|---|
| <call daddy> <br> <call joe> <br> <call smith> <br> <call joe smith in westfield> <br> <call daddy in westfield new jersey> <br> <call daddy in new jersey> | 908-555-1212 |

The extent and level of details of the construction of the enhanced grammar for each VAC list may be changed in accordance with particular system design factors.

In another example, assume for the moment that the second user has a particular tag associated with more than one telephone number. VAC adjunct 114 can use search results, e.g., addresses, to resolve ambiguities between each telephone number. For example, assume the first user's VAC list appears as follows:

| Voice Label | Telephone Number |
|---|---|
| Dutton-Narayan-Zeljkovic 1-4-6 <br> <call daddy> | 908-555-1212, 908-555-1111 |

By retrieving the corresponding addresses for each number, VAC adjunct 114 can construct the grammar shown at the second point above. Further, knowledge can be incorporated in the grammar regarding "home" or "work" or even "name of the work" place by searching the appropriate databases. For example, module 218 searches database 118 and retrieves the ADDRESS corresponding to the first number, and an ADDRESS2, "AT&T, 200 Laurel Avenue, Middletown, N.J. 07748," corresponding to the second number. Through a set of rules or heuristics, module 218 infers whether the address is a business address or a home address. This inference could be made based on the general characteristics of the area located by the address (e.g., business district versus residential), from which database the information was found (e.g., electronic white pages versus electronic yellow pages), and so forth. This information would be passed to natural language interface module 216 to build the following grammar:

| Voice Label | Telephone Number |
|---|---|
| <call daddy> | 908-555-1212 |
| <call joe> | |
| <call smith> | |
| <call joe smith in westfield> | |
| <call daddy in westfield new jersey> | |
| <call daddy in new jersey> | |
| <call daddy at home> | |
| <call daddy at work> | 908-555-1111 |
| <call daddy at middletown> | |
| <call joe at AT&T> | |
| <call smith at work> | |
| . . . and so on. | |

In yet another example, the principles of the present invention could be further expanded to provide additional inferences or extrapolations. For example, assume there are four telephone numbers associated with a single tag, such as follows:

| Voice Label | Telephone Number |
|---|---|
| <grandma> | phone1, phone2, phone3, phone4 |

Module 218 searches various databases and finds that one of the telephone numbers is in New Jersey, one in Connecticut, one in Palm Beach, Fla., and one in Orlando, Fla. Module 216 could construct a grammar as follows:
   call<grandma> in<NJ> phone 1
   call<grandma> in<CT> phone 2
   call<grandma> in<FL/Palm Beach> phone 3
   call<grandma> in<FL/Orlando> phone 4.

In yet another embodiment of the invention, the principles of the present invention could be used in cases of urgent need or emergency in contacting friends or relatives. Assume that a son in a critical situation requires information such as the telephone number of a neighbor to his mother whom he has unsuccessfully been able to contact. In many cases, the son has no knowledge of the telephone number or, even the names of the neighbors, and obtaining such information in a timely fashion may not be straightforward. VAC adjunct 114 could be configured to perform a "proximity search" of a database having electronic white pages for those names, addresses and telephone numbers of neighbors within five houses of mom's house. Module 216 could then construct a grammar that understands such voice commands as "call neighbor of grandma in Florida" or "call police for grandma in Florida."

In another example, assume the second user's telephone is a work number. VAC adjunct 114 could search an employee database to find the second user's co-workers, such as his supervisor or administrative assistant. Module 216 could then construct a grammar that understands such voice commands as "call joe's boss" or "call Mr. Smith's administrative assistant."

Although various embodiments are specifically illustrated and described herein, it will be appreciated that modifications and variations of the present invention are covered by the above teachings and are within the purview of the appended claims without departing from the spirit and intended scope of the invention. For example, although the Internet and WWW were specifically described as possible resources for additional attributes or information items, it can be appreciated that any number of databases such as human resource databases, public tax record databases or public real estate databases could be searched and still fall within the scope of the invention. Further, although a natural language interface was illustrated, it can be appreciated that any type of expert system or translation system can be utilized to interpret user voice commands and fall within the scope of the invention.

The invention claimed is:

1. A method for creating a data structure for use in a Voice-Activated Connection system, said method comprising the steps of:
   a) receiving a request to create said data structure, said request including a first information item;
   b) querying at least one pre-defined database using said first information item as a search key to retrieve additional information; and
   c) creating said data structure using said first information and said additional information as data elements,
   wherein said data structure associates said retrieved additional information with said first information item.

2. The method of claim 1 wherein said data elements form a grammar used by said voice-activated connection system to parse commands received from a user.

3. A method for defining an interface for a system to receive voice commands to connect a first user to a second user over a network, comprising the steps of:
   a) receiving a request to define said interface;
   b) receiving a first information item;
   c) searching at least one database for a second information item indexed by said first information item; and
   d) constructing a grammar for said interface using said first and second information items.

4. The method of claim 3, further comprising the step of searching at least one database for a third information item based on said second information item.

5. The method of claim 3, further comprising the steps of:
   receiving a voice command for connecting said first user to said second user;
   parsing said request using said interface; and
   connecting said first user to said second user based on said parsed request.

6. The method of claim 3, wherein said database stores at least one of a group comprising electronic white pages, electronic yellow pages, HTML documents, calling service profiles and electronic user profiles.

7. The method of claim 3, wherein steps c) and d) are repeated until said search is complete.

8. The method of claim 3, wherein said grammar is used by a natural language interface.

9. The method of claim 3, wherein said database is accessed using a transmission control protocol/internet protocol.

10. The method of claim 3, wherein said database is accessed using a hypertext transfer protocol.

11. An apparatus for defining an interface for a system to receive voice commands to connect a first user to a second user over a network, comprising:
   means for receiving a request to define said interface;
   means for receiving a first information item;
   means for searching at least one database for a second information item indexed by said first information item; and
   means for constructing a grammar for said interface using said first and second information items.

12. The apparatus of claim 11, further comprising means for searching at least one database for a third information item based on said second information item.

13. The apparatus of claim 11, further comprising the steps of:
   receiving a voice command for connecting said first user to said second user;
   parsing said request using said interface; and
   connecting said first user to said second user based on said parsed request.

14. The apparatus of claim 11, wherein said database stores at least one of a group comprising electronic white pages, electronic yellow pages, employee files, HTML documents, calling service profiles and electronic user profiles.

15. The apparatus of claim 11, wherein said means for searching searches until a search ending condition is reached.

16. The apparatus of claim 11, wherein said grammar is for a natural language interface.

17. The apparatus of claim 11, wherein said database is accessed using a transmission control protocol/internet protocol.

18. The apparatus of claim 11, wherein said database is accessed using a hypertext transfer protocol.

19. A voice-activated connection system, comprising:
   a voice-activated connection module receiving a first information item, said voice-activated connection module generating a search request;
   a database in communication with said voice-activated connection module, said database receiving said search request and sending a search result to said voice-activated connection module; and
   a natural language interface module coupled to said voice-activated connection module receiving said search result and constructing a natural language grammar based on said search results.

20. A computer for performing voice-activated connections, comprising:
   a memory containing:
      a voice-activated connection program having functions for searching for information items;
      a natural language interface program having functions for building a natural language grammar; and
   a processor for running the voice-activated connection program and the natural language interface program.

21. A computer-readable medium whose contents cause a computer system to perform voice-activated connections, the computer system having a voice-activated connection program and a natural language interface program, by performing the steps of:
   receiving a request to define said interface by the voice-activated connection program;
   receiving a first information item by the voice-activated connection program;
   searching at least one database for a second information item indexed by said first information item by the voice-activated connection program; and
   constructing a grammar for said interface using said first and second information items by the natural language interface program.

* * * * *